US006856673B1

United States Patent
Banks et al.

(10) Patent No.: US 6,856,673 B1
(45) Date of Patent: Feb. 15, 2005

(54) TARGETED ADVERTISING IN A TELEPHONE DIALING SYSTEM

(75) Inventors: Diane Banks, Basking Ridge, NJ (US); Charles Douglas Blewett, Madison, NJ (US); Donnie Henderson, Manalapan, NJ (US); David Millen, Boxford, MA (US)

(73) Assignee: AT&T Corp., New York, NY (US)

( * ) Notice: Subject to any disclaimer, the term of this patent is extended or adjusted under 35 U.S.C. 154(b) by 69 days.

(21) Appl. No.: 10/096,918

(22) Filed: Mar. 13, 2002

(Under 37 CFR 1.47)

(51) Int. Cl.[7] .............................................. H04M 15/00
(52) U.S. Cl. ............................... 379/114.13; 379/114.1; 379/114.12; 379/114.01
(58) Field of Search ............................. 379/32.01, 67.1, 379/70, 88.17, 114.13, 114.12, 114.18, 133, 134, 136, 201.01, 219, 221.01

(56) References Cited

U.S. PATENT DOCUMENTS

| | | | |
|---|---|---|---|
| 4,850,007 A | * | 7/1989 | Marino et al. ......... 379/114.13 |
| 5,056,086 A | | 10/1991 | Libonati |
| 5,181,236 A | | 1/1993 | LaVallee et al. |
| 5,181,238 A | | 1/1993 | Medamana et al. |
| 5,181,239 A | | 1/1993 | Jolissaint |
| 5,185,782 A | | 2/1993 | Srinivasan |
| 5,187,735 A | | 2/1993 | Herrero Garcia et al. |
| 5,239,577 A | | 8/1993 | Bates et al. |
| 5,444,774 A | | 8/1995 | Friedes |
| 5,448,625 A | * | 9/1995 | Lederman ................ 379/88.25 |
| 5,652,784 A | * | 7/1997 | Blen et al. ................. 379/67.1 |
| 5,684,872 A | | 11/1997 | Flockhart et al. |
| 5,729,593 A | | 3/1998 | Baker et al. |
| 5,768,356 A | | 6/1998 | McKendry et al. |
| 5,825,856 A | | 10/1998 | Porter et al. |
| 5,828,839 A | | 10/1998 | Moncreiff |
| 5,933,811 A | * | 8/1999 | Angles et al. ................ 705/14 |
| 5,937,390 A | | 8/1999 | Hyodo |
| 5,937,392 A | | 8/1999 | Alberts |
| 5,948,061 A | | 9/1999 | Merriman et al. |
| 5,970,124 A | | 10/1999 | Csaszar et al. |
| 5,978,451 A | * | 11/1999 | Swan et al. .............. 379/88.24 |
| 5,991,394 A | | 11/1999 | Dezonno et al. |
| 6,038,591 A | | 3/2000 | Wolfe et al. |
| 6,055,510 A | | 4/2000 | Henrick et al. |
| 6,084,628 A | | 7/2000 | Sawyer |
| 6,122,255 A | | 9/2000 | Bartholomew et al. |
| 6,385,308 B1 | * | 5/2002 | Cohen et al. ............ 379/88.23 |
| 6,603,844 B1 | * | 8/2003 | Chavez et al. ......... 379/114.13 |
| 6,606,652 B1 | * | 8/2003 | Cohn et al. ................. 709/217 |

* cited by examiner

*Primary Examiner*—Quoc Tran

(57) ABSTRACT

A system and method for providing targeted advertising to telephone callers in mid-dial. The invention monitors the dialing activities of a caller. When a caller enters a partial desired telephone number, an embodiment of the present invention receives the partial number and determines whether an advertisement should be presented to the caller. If all of the appropriate conditions are met, a selected advertisement is transmitted to the caller's telephony device and the caller is given the opportunity to respond to the advertisement before the dialing operation completes.

10 Claims, 7 Drawing Sheets

| ADVERTISER 410 | ADS 420 | TRIGGERING CRITERIA 430 | NUMBER OF ADS PRESENTED 440 | ... |
|---|---|---|---|---|
| ABC TELEPHONE CO. | #1 | ... | ... | |
| | #2 | ... | ... | |
| | #3 | ... | ... | |
| LOCAL PIZZA SHOP | #1 | ... | ... | |
| | #2 | ... | ... | |
| ⋮ | . | ... | ... | |
| | . | ... | ... | |
| | . | ... | ... | |

FIG. 5
500

| CALLER IDENTIFIER (510) | CALLED NUMBERS (520) | TYPE OF BUSINESS OR RELATIONSHIP (530) | NUMBER OF CALLS (540) | IS FUNCTION AVAILABLE (550) | ... |
|---|---|---|---|---|---|
| XXX-XXX-XXX | AAA-AAA-AAAA | MOTHER | 5 | NO | |
| | BBB-BBB-BBBB | PIZZA | 3 | | |
| | CCC-CCC-CCCC | LONG DISTANCE PROVIDER | 10 | | |
| | ... | ... | ... | ... | |
| YYY-YYY-YYY | ... | ... | ... | ... | |
| | ... | ... | ... | ... | |
| ⋮ | ... | ... | ... | ... | |
| | ... | ... | ... | ... | |
| | ... | ... | ... | ... | |

TARGETED ADVERTISING IN A TELEPHONE DIALING SYSTEM

TECHNICAL FIELD

The present invention relates to telecommunications networks. More particularly, the invention relates to a method and apparatus for providing targeted advertising to callers during telephone number dialing operations.

BACKGROUND OF THE INVENTION

In advertising, it is considered highly desirable to target advertisements to an appropriate potential customer base, rather than to broadcast advertisements to a general segment of the population. Many companies attempt to obtain information about customers so they may identify particular customers having potential interests in specific products and services, and then directly market those customers at some time in the future.

Concurrently, advertisers continue to look for new ways to advertise their products, and to advertise more effectively. Methods of targeting advertisements have become increasingly sophisticated. For example, many grocery stores now print coupons for customers at the checkout counter. These coupons provide discounts for items similar to those the customers has just purchased. Similarly, revenues from Internet advertisements continue to grow as Internet web sites provide constantly updated advertisements to visiting consumers.

As is known, telephony-based advertising systems may include automated answering devices that queue an incoming call when no attendant is immediately available. While a caller waits in a holding queue, a processor may solicit and collect initial information from the caller. This solicited information may then be used to select and deliver to the caller customized information. Alternatively, a caller's profile may be stored in a database containing various demographic and consumer characteristics. As the caller waits on hold, a processor may select and play advertisements matching the caller's characteristics.

Targeted marketing during video telephone calls is also not new. Such systems operate in a telecommunications network to provide targeted advertising to callers who utilize display screens to conduct a video telephone call. While a call is in progress, advertisements matching a caller's profile may be selected and presented on the caller's display screen.

The present invention is directed to the problem of providing targeted advertising to telephone callers as they are dialing numbers to initiate a telephone call. Such advertisements would provide callers with targeted offers that are influenced by the partial dialing of telephone numbers, as well as related to a caller's telephone usage history.

SUMMARY OF THE INVENTION

Embodiments of the present invention provide a method and apparatus for presenting targeted advertising to callers utilizing a telephony system. According to an embodiment, the invention monitors the dialing activities of a caller and transmits directed advertisements to the caller in mid-dial. When a caller dials a telephone number, an embodiment of the present invention monitors the dialing operation as it progresses. When the caller enters each digit of the desired telephone number, an embodiment of the present invention receives each entered digit and determines whether an advertisement should be presented to the caller. If the appropriate conditions are met, a selected advertisement is transmitted to the caller's telephony device and the caller is given the opportunity to accept the advertisement. Examples of mid-dial advertisements might include: (1) a special offer to use a different long-distance carrier at a lower rate for the current telephone call; (2) an offer to supply new calling features at a reduced rate for a limited time; or (3) a notice that the current long-distance call is free of charge because it is the tenth call to the same number this week. By making the appropriate key selection (for example, pressing the '#' key), the caller may accept the advertised offer and may then be led through further automated interactions, or may be directed to a waiting operator.

Other embodiments of the present invention contemplate selecting targeted advertisements based on factors other than a partial telephone number. These factors may include call history, caller demographics, day of the year and time of day, as well as the operating characteristics of the specific telephony device from which the caller is calling.

DETAILED DESCRIPTION

Figure 1:
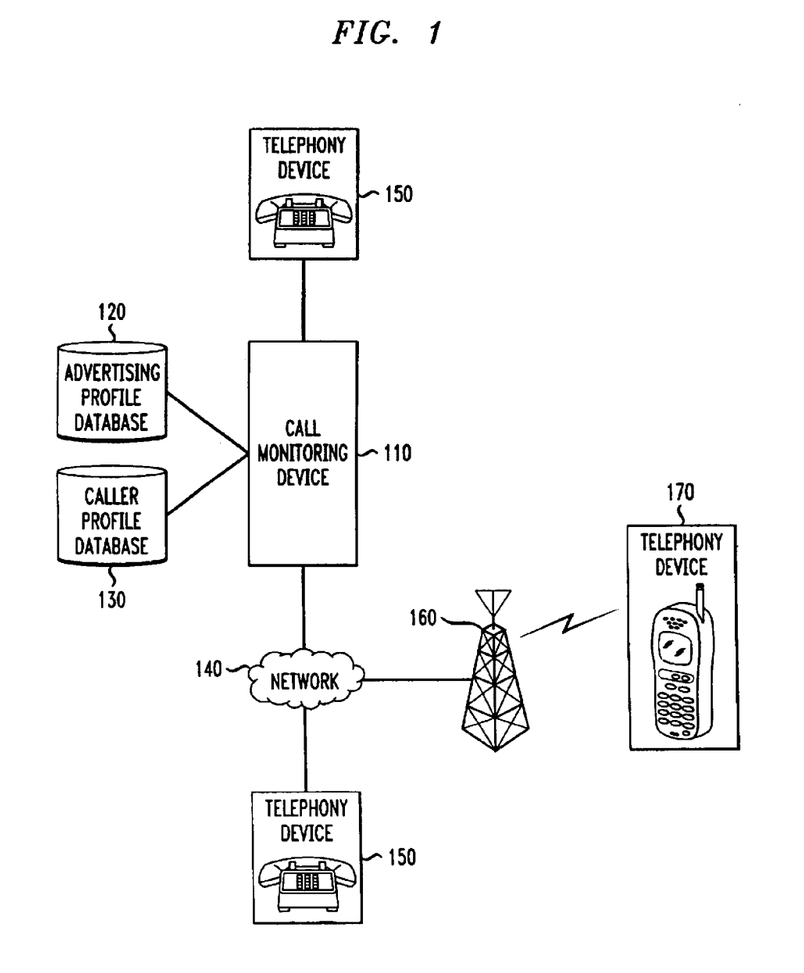
FIG. 1 is block diagram of a system including an embodiment of the present invention.

The present invention is directed to a method and apparatus for providing targeted advertising to callers utilizing a telephony system. Referring now in detail to the drawings, wherein like parts are designated by like reference numerals throughout, there is illustrated in FIG. 1 a block diagram of a system including an embodiment of the present invention. The system may comprise a call monitoring device 110 that accesses an advertising profile database 120 and a caller profile database 130. Call monitoring device 110 may communicate with a telecommunications network 140, which may then communicate with a telephony device 150. Network 140 may also communicate via a wireless radio telecommunications network 160 to a wireless telephone device 170.

Continuing to refer to FIG. 1, telephony device 150 may be any device capable of initiating and sustaining a telephone call. Thus, for example, telephone device 150 may be a standard telephone, a video telephone, a cellular telephone, or a computer configured to support a telephony application using the Internet.

Figure 2:
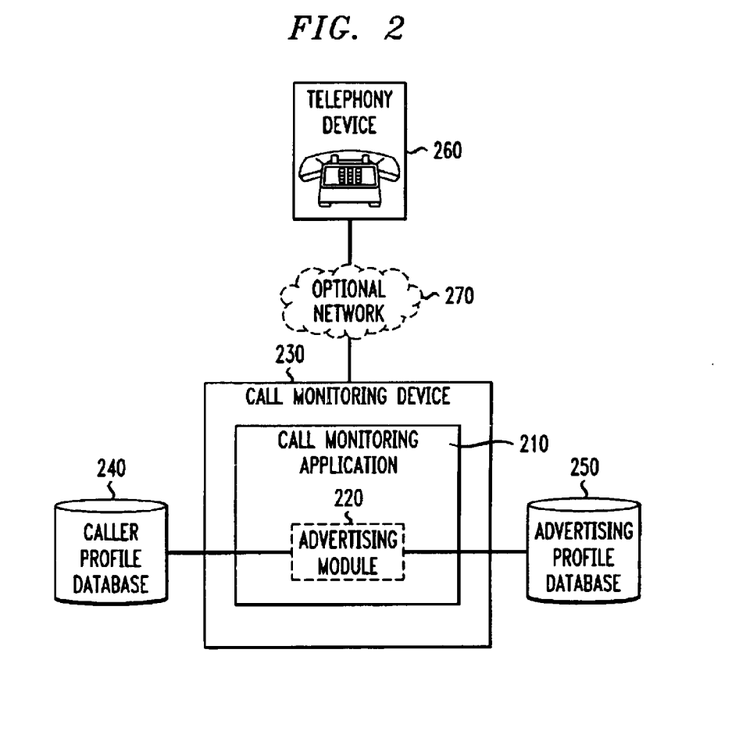
FIG. 2 is a block diagram of a call monitoring device in accordance with an embodiment of the present invention.

FIG. 2 is a block diagram of a call monitoring device in accordance with an embodiment of the present invention. When a caller initiates a call, a telephony device 260 may transmit to call monitoring device 230 (optionally through a network 270) dial codes that indicate the individual digits of a desired telephone number. These codes may be in the form of DTMF (Dual-Tone Multi-Frequency) signals or their equivalent. For each code transmitted by telephony device 260, a call monitoring application 210 executing within call monitoring device 230 may receive the transmitted code and interact with an advertising module 220 to determine whether an advertisement should be presented to the caller. Advertising module 220 may submit queries to a caller profile database 240 and an advertising profile database 250 for the purpose of retrieving caller profiles and advertiser preferences, and may then select a specific advertisement for delivery to telephony device 260. Once advertising module 220 selects an advertisement, call monitoring application 210 coordinates the delivery of the advertisement to telephony device 260 and, if necessary based on the characteristics of the individual advertisement, call monitoring application 210 may also interact with the caller via telephony device 260 to allow the caller to accept the advertisement and take advantage of its offer.

An advertisement that is delivered to telephony device 260 by call monitoring device 230 may be entirely auditory in nature, or exclusively visual in nature, or the advertisement may comprise both auditory and visual information. Additionally, an advertisement may be interactive, in that a caller may be given an opportunity to select from various options, in order to customize the delivery of the advertisement. Methods for delivering audio and video advertisements to telephony devices are well known in the art. Similarly, methods of determining caller acceptance of an advertisement are also well known in the art. For example, a caller may indicate acceptance of a delivered advertisement by pressing the '#' key on a standard telephone. If the telephony device 260 is a computer configured to support a telephony application, caller acceptance may be indicated by pressing a special key on the keyboard, or it may be indicated by the caller pressing a mouse button while a cursor is within an "acceptance" area defined within an advertisement graphic. Caller acceptance of an advertisement may also be achieved by a caller repeating a supplied code to a particular vendor within a specified time-frame for a defined transaction.

One example of an advertisement is a message in which a caller is informed that his or her currently dialed long-distance call can be completed at a discount over a competitor telephone network. In this example, if the caller indicates acceptance, the call would then be placed according to the advertised conditions.

Another example of an advertisement is a message informing a caller that his or her currently dialed long-distance call is being made free of charge.

Figure 3:
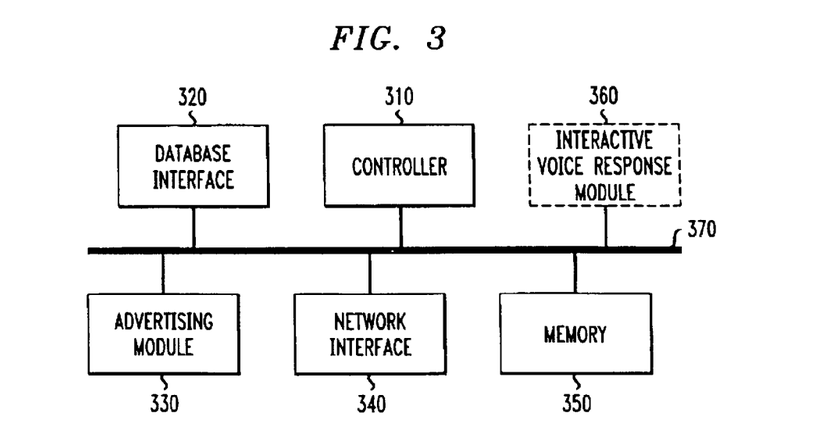
FIG. 3 is a block diagram of various internal components of a call monitoring device in accordance with an embodiment of the present invention.

FIG. 3 is a block diagram of various internal components of a call monitoring device in accordance with an embodiment of the present invention. Call monitoring device may include a communication medium 370 in communication with a controller 310, a database interface module 320, an advertising module 330, a network interface module 340, a memory 350, and an optional interactive voice response module 360. Communication medium 370 may comprise a conventional computer network and may also comprise a computer bus. Controller 310 may receive caller-initiated partial telephone numbers via the network interface module 340 and may then interact with advertising module 330 and database interface module 320 to determine whether an advertisement should be presented to a caller. If controller 310, in cooperation with the advertising module 330, concludes that an advertisement should be presented, controller 310 may then retrieve a selected advertisement employing coordinated operation of advertising module 330 and database interface module 320, and may then deliver the selected advertisement to the caller via coordinated operation of network interface 340 and optionally interactive voice response module 360. Memory module 350 may be utilized by any of the other modules when memory is necessary to store and manage information related to a call or when memory is necessary to conduct advertising search and delivery functions.

Figure 4:
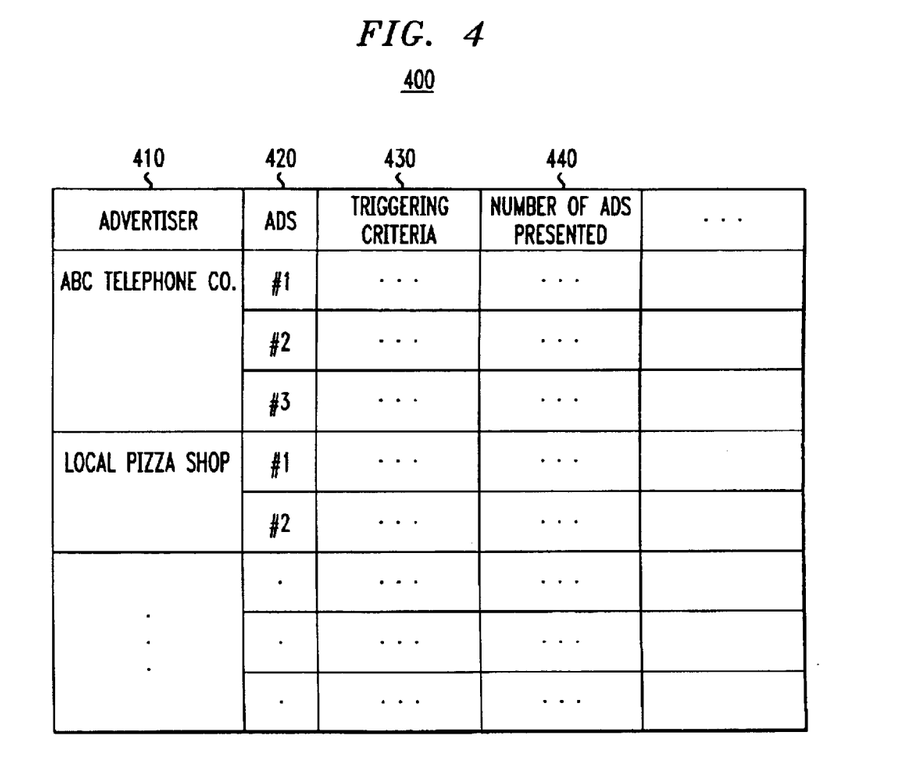
FIG. 4 is an example of an advertising profile table according to an embodiment of the present invention.

FIG. 4 is an example of an advertising profile table according to an embodiment of the present invention. The present invention may use an advertiser profile 400, which may reside in an advertising profile database (see FIG. 2, item 250), to determine whether an advertisement should be presented to a caller during a monitored dialing operation. An advertiser profile 400 may contain a list of advertisers 410 and, for each advertiser, a list of advertisements 420, the triggering conditions 430 for each advertisement 420, and other pertinent information, including the number of times a given advertisement 420 has been presented 440. When a caller initiates dialing operations for a new call, a call monitoring application 210 (FIG. 2) may invoke an advertising module 220 (FIG. 2) to determine whether any of the triggering criteria 430 for each advertisement 420 match the caller profile information (see FIG. 5), as well as match the accumulated partial telephone number codes received thus far. When a match occurs, the matching advertisement is identified such that call monitoring device 230 (FIG. 2) may then deliver the advertisement to the caller. If more than one advertisement matches, a final selection may be made by methods known in the art, including round robin selection and random selection.

Figure 5:
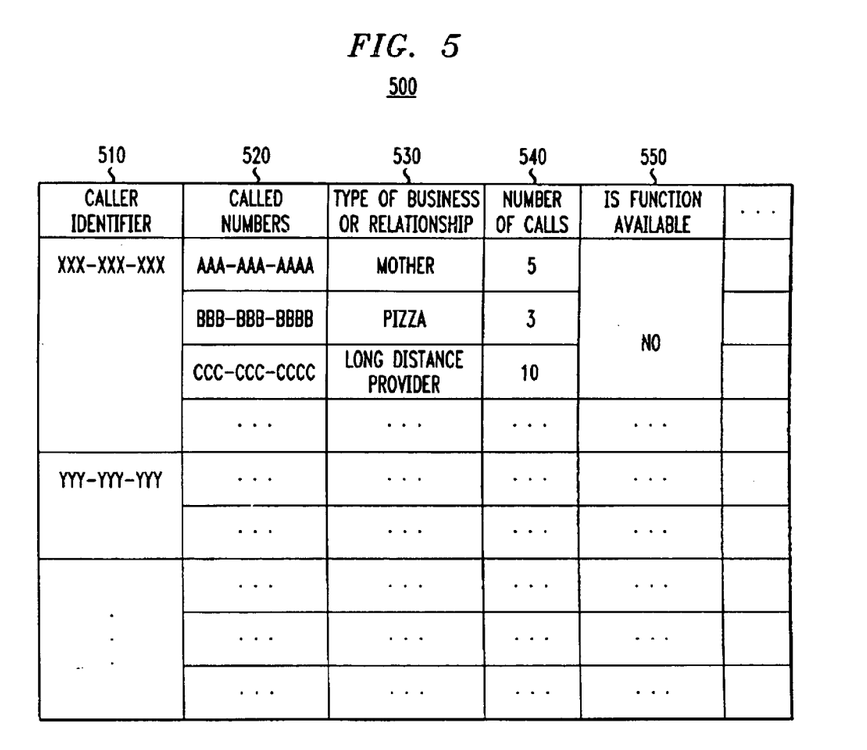
FIG. 5 is an example of a caller profile table according to an embodiment of the present invention.

FIG. 5 is an example of a caller profile table according to an embodiment of the present invention. Caller profiles 500 provide information to call monitoring device 230 (FIG. 2) which helps the present invention match advertisements with specific caller/callers. A caller profile 500, which may reside in a caller profile database (see FIG. 2, item 240), may include for each telephony device (see FIG. 2, item 260) a caller identifier 510 as well as information describing each telephone number that the caller has recently called 520. Caller profile 500 may also include for each caller a series of flags that further define the caller, including whether the caller has indicated a desire to disable an advertising feature 550. For each called telephone number 520, caller profile 500 may also contain a type of relationship 530 the caller has to a called number 520 and the number of times 540 the caller has called that number.

Figure 6:
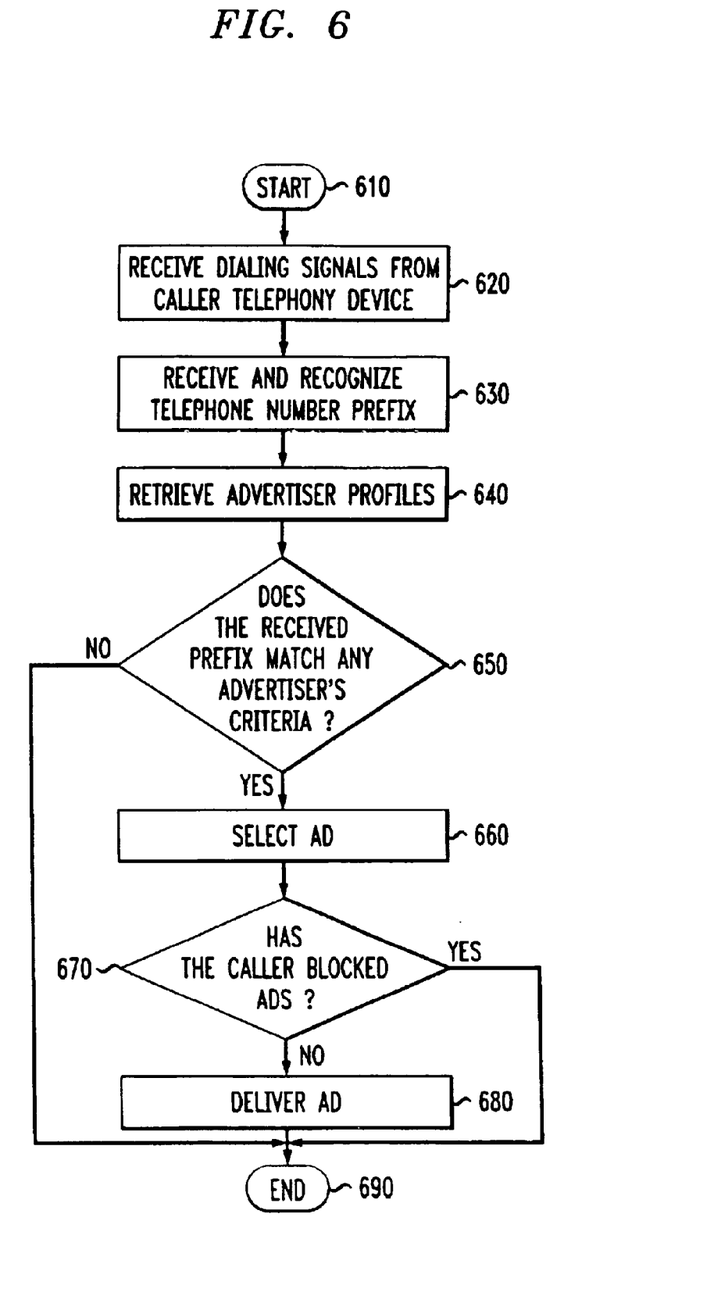
FIG. 6 is a flow diagram of the call monitoring control logic in accordance with a first embodiment of the present invention.

FIG. 6 is a flow diagram of the call monitoring control logic in accordance with an embodiment of the present invention. The operation may begin (610) when the call monitoring device receives a dialing signal from a caller (620) and then recognizes the dialing codes corresponding to a telephone number prefix (630). After relevant advertising profiles have been retrieved (640), the call monitoring device may compare the caller's dialed prefix with the retrieved advertising profiles (650). If the prefix matches any advertiser criteria (650), the call monitoring device may then select the advertisement (660). If the caller has not blocked advertisements (670), the call monitoring device may then deliver the advertisement (680). The operation may then end (690).

Figure 7A:
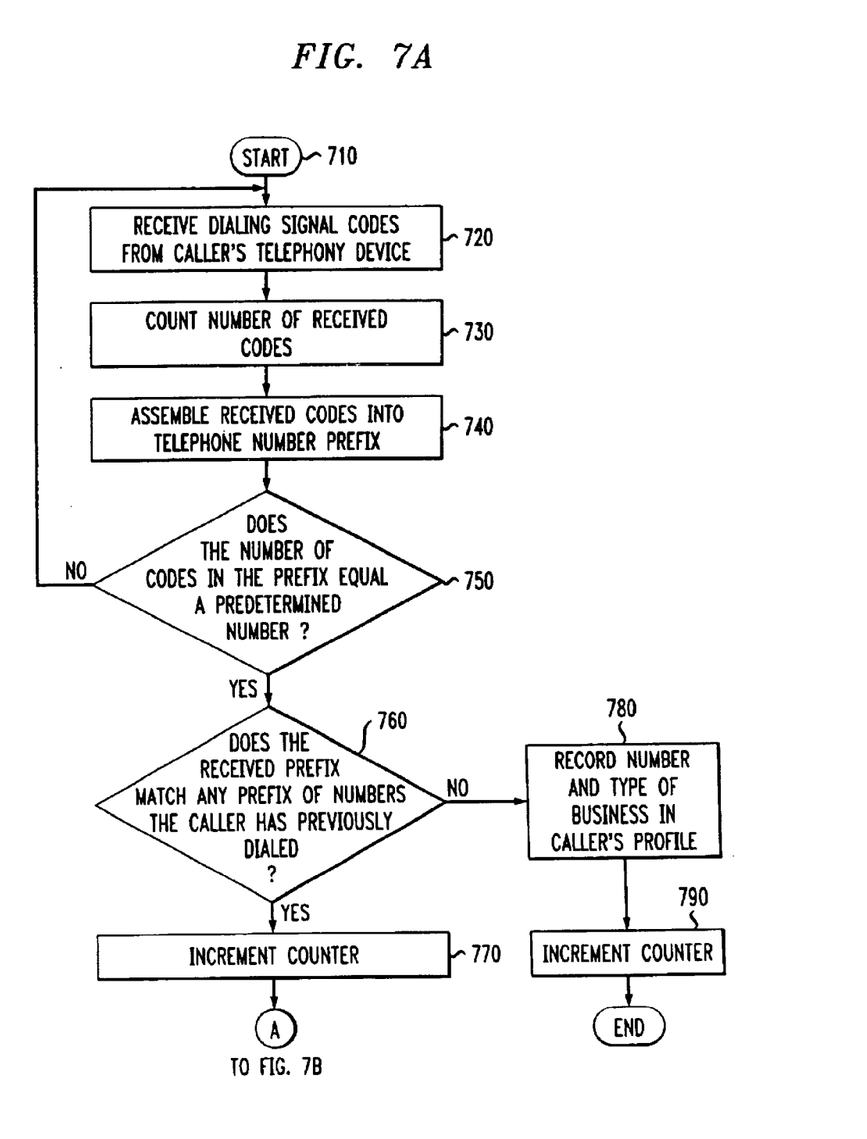
FIGS. 7A and 7B are flow diagrams showing the call monitoring control logic in accordance with a second embodiment of the present invention.
Figure 7B:
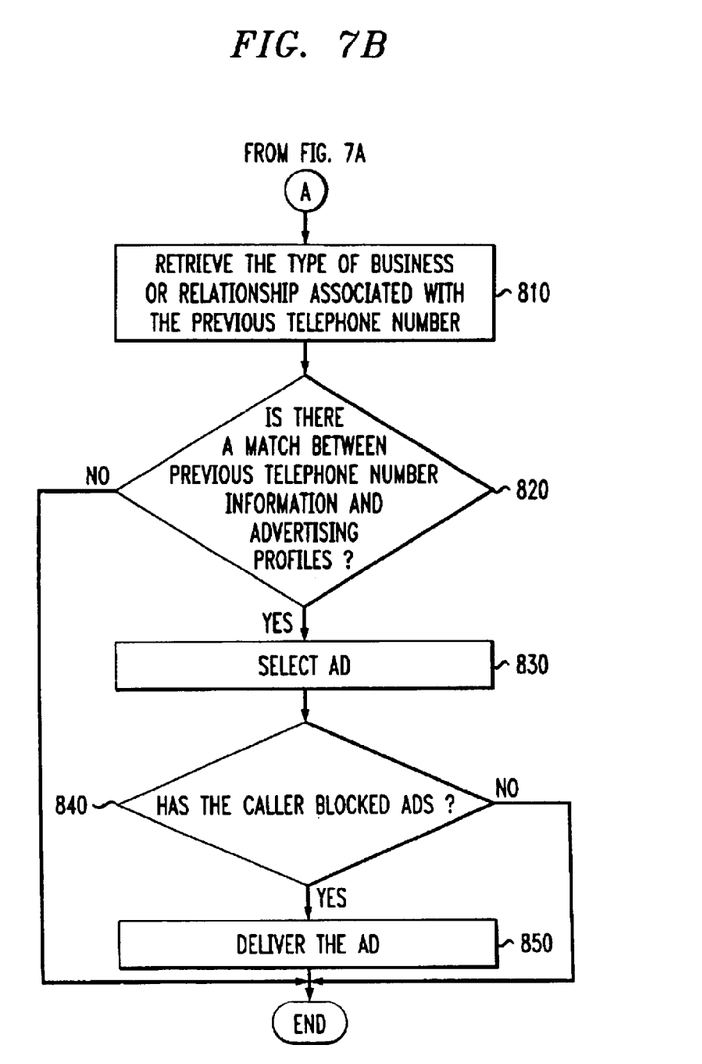

FIGS. 7A and 7B are flow diagrams showing the call monitoring control logic in accordance with another embodiment of the present invention. The operation may begin (710) when a call monitoring device receives dialing signal codes from a caller's telephony device (720) optionally through a telephone network, and then counts the number of codes that have been received (730) and assembles the codes into a telephone number prefix (740). If the number of codes in the received prefix does not equal a predetermined number (750), the call monitoring device may then return to receiving dialing signal codes from the caller's telephony device (720). If, however, the received prefix is large enough, the call monitoring device will then determine whether the received prefix matches any prefix of the caller's previously dialed telephone numbers (760). If not, the call monitoring device will treat the received prefix as corresponding to a new phone number. The call monitoring device will then record as much information as possible about the new phone number in the caller's profile (780) and increment a counter associated with the new phone number (790).

Continuing to refer to FIGS. 7A and 7B if the call monitoring device determines that a received prefix matches that of a previously-dialed telephone number (760), the call monitoring device will first increment a counter associated with that telephone number (770). Then, the call monitoring device will retrieve from the caller's profile the information associated with the previously dialed telephone number (810) and will determine whether that information matches any criteria in the advertising profile database (820). If a match occurs, the matching advertisement is then selected (830). If the caller has not blocked advertisements (840), the call monitoring device may then deliver the advertisement (850).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A telephony targeted advertising system, comprising:
   a call monitoring device having an advertising module and an input for receiving a dialing operation from a telephony device, the dialing operation including a dialed telephone number;
   an advertising profile database coupled to the advertising module; and
   a caller profile database coupled to the advertising module;
   the call monitoring device operable to monitor the received dialing operation and to determine whether an alternative telephone network is available to complete a call to the dialed telephone number at a discount, the advertising module to select an advertisement based on whether a discounted alternative network is available, the advertisement offering connection via the discounted alternative network and being interactive to permit a caller to accept the offer, and the call monitoring device to deliver the selected advertisement to the telephony device while the dialing operation is in progress.

2. The system of claim 1, wherein the advertisement module selects an advertisement based on a caller profile and an advertising profile.

3. The system of claim 1, wherein the call monitoring device receives an acceptance of the delivered advertisement from the telephony device, and causes the call to be connected over the alternative network.

4. A method of providing targeted telephony advertising in mid-dial, comprising:
   receiving a partial sequence of digits of a dialed telephone number from a telephony device;
   based on the partial sequence, determining whether an alternative telephone network is available to complete a call to the dialed telephone number at a discount;
   selecting an advertisement based on the partial sequence; and
   delivering the selected advertisement to the telephony device, the advertisement including an offer to complete the call over the alternative telephone network and further including an interactive caller input for accenting the offer; and
   if the caller accepts the offer, completing the call over the alternative telephone network.

5. The method of claim 4, wherein the selecting is further based on a caller profile and an advertising profile.

6. The method of claim 5, wherein the caller profile is stored in a caller profile database and the advertising profile is stored in an advertising profile database.

7. A method of providing targeted advertising, comprising:
   monitoring a dialing operation of a telephony device, the dialing operation including a dialed telephone number;
   selecting an advertisement based on a determination that an alternative telephone network is available to complete a call to the dialed telephone number at a discount;
   delivering the advertisement to the telephony device while the dialing operation is in progress; the advertisement including an offer to complete the call over the alternative telephone network and further including an interactive caller input for accepting the offer; and
   if the caller accepts the offer, completing the call over the alternative telephone network.

8. The method of claim 7, wherein the selecting is further based on a caller profile and an advertising profile.

9. The method of claim 8, wherein the caller profile is stored in a caller profile database.

10. The method of claim 8, wherein the advertising profile is stored in an advertising profile database.

* * * * *